US012738537B2

(12) United States Patent
Tani et al.

(10) Patent No.: US 12,738,537 B2
(45) Date of Patent: Sep. 15, 2026

(54) COMPOSITE, POLYMER ELECTROLYTE, ELECTROCHEMICAL DEVICE, POLYMER-BASED SOLID-STATE BATTERY, AND ACTUATOR

(71) Applicant: DAIKIN INDUSTRIES, LTD., Osaka (JP)

(72) Inventors: Akinori Tani, Osaka (JP); Junpei Terada, Osaka (JP); Takaya Yamada, Osaka (JP); Kae Fujiwara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 917 days.

(21) Appl. No.: 17/922,561

(22) PCT Filed: Apr. 28, 2021

(86) PCT No.: PCT/JP2021/017014
§ 371 (c)(1),
(2) Date: Oct. 31, 2022

(87) PCT Pub. No.: WO2021/221113
PCT Pub. Date: Nov. 4, 2021

(65) Prior Publication Data

US 2023/0187694 A1 Jun. 15, 2023

(30) Foreign Application Priority Data

May 1, 2020 (JP) ................................ 2020-081427

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01)

(58) Field of Classification Search
CPC ..... H01M 10/0565; H01M 2300/0082; H01M 10/052; H01M 10/0525
See application file for complete search history.

(56) References Cited

U.S. PATENT DOCUMENTS 3,282,875 A * 11/1966 Connolly .............. C07C 309/82 562/110
7,070,632 B1 * 7/2006 Visco .................. H01M 4/5815 429/231.95
2004/0122256 A1 * 6/2004 Ikeda .................. H01M 8/1023 562/1
2005/0245707 A1 * 11/2005 Arase .................. C08F 214/262 526/249
2010/0148635 A1 6/2010 Kwon et al.
2011/0311881 A1 12/2011 Benicewicz
2012/0009480 A1 * 1/2012 Ohashi .............. H01M 10/0567 429/300
2013/0225764 A1 * 8/2013 Tatemoto ............ H01M 8/1025 524/805
2015/0021261 A1 * 1/2015 Shiotani .................... C08F 8/12 210/500.36
2015/0194701 A1 * 7/2015 Kim .................. H01M 10/0565 429/302
2015/0228887 A1 * 8/2015 Park ..................... C08K 5/3445 429/492
2017/0222244 A1 * 8/2017 Kim .................. H01M 10/0525
2018/0022846 A1 1/2018 Kanbara et al.
2019/0233599 A1 8/2019 Hamon et al.
2020/0185769 A1 6/2020 Hamon et al.

FOREIGN PATENT DOCUMENTS

| | | | |
|---|---|---|---|
| CN | 106654364 | A | 5/2017 |
| EP | 1 049108 | A1 | 11/2000 |
| JP | 10-21963 | A | 1/1998 |
| JP | 2001-035534 | A | 2/2001 |
| JP | 2010-142108 | A | 6/2010 |
| JP | 2011-174032 | A | 9/2011 |
| JP | 2014-168951 | A | 9/2014 |
| JP | 2019-513875 | A | 5/2019 |
| JP | 2019-525971 | A | 9/2019 |
| WO | 99/28916 | A1 | 6/1999 |
| WO | 2016/133206 | A1 | 8/2016 |

OTHER PUBLICATIONS

Extended European Search Report dated Jan. 9, 2025 from the European Patent Office in Application No. 21796411.3.
International Preliminary Report on Patentability with translation of Written Opinion dated Oct. 27, 2022 from the International Bureau in International Application PCT/JP2021/017014.
International Search Report of PCT/JP2021/017014 dated Jun. 22, 2021 [PCT/ISA/210].

* cited by examiner

*Primary Examiner* — Jeremiah R Smith
(74) *Attorney, Agent, or Firm* — Sughrue Mion, PLLC

(57) ABSTRACT

A composite containing a fluorine-containing copolymer, an alkali metal salt, and an ionic liquid. The fluorine-containing copolymer essentially contains: a structural unit represented by formula (1): $—[CR^1R^2—CR^3R^4]—$ wherein $R^1$ to $R^4$ are each independently H, F, Cl, $CF_3$, or $OR^{10}$, where $R^{10}$ is an organic group having 1 to 8 carbon atoms, provided that at least one of $R^1$ to $R^4$ is F; and a structural unit represented by formula (2): $—[CR^5R^6—CR^7R^8]—$ wherein $R^5$ to $R^8$ are each independently H, F, an alkyl group having 1 to 3 carbon atoms, a functional group containing a heteroatom other than the fluorine atom, or a group containing the functional group. At least one of $R^5$ to $R^8$ is a functional group containing a heteroatom other than the fluorine atom or a group containing the functional group, and the composite has a volatile content of 0.1 mass % or less.

14 Claims, 1 Drawing Sheet

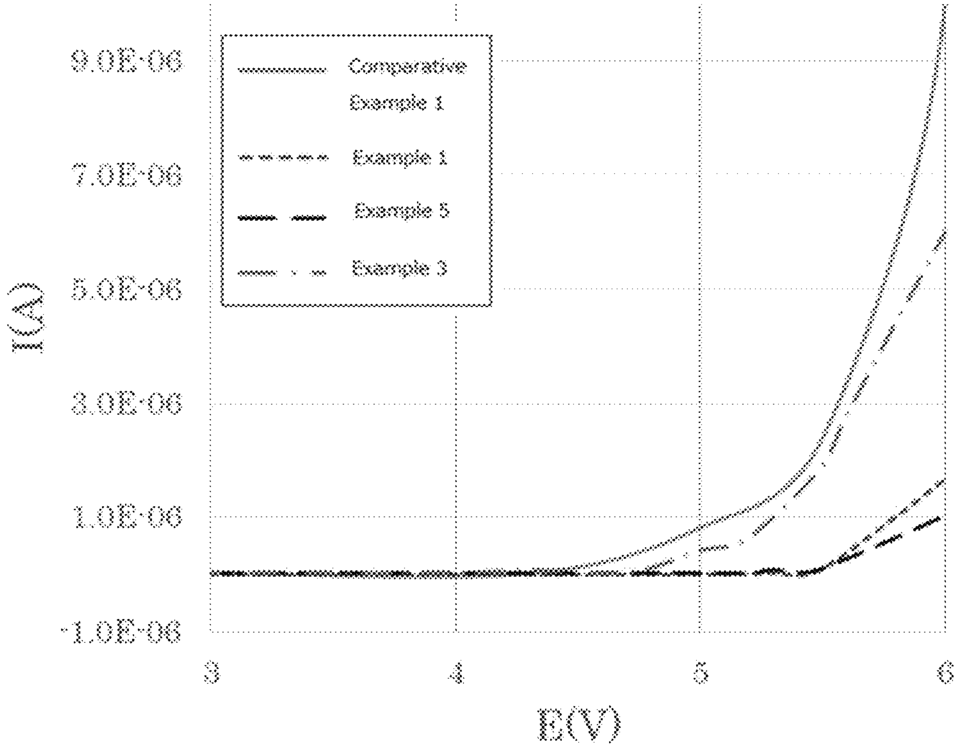
9.0E-06
7.0E-06
5.0E-06
3.0E-06
1.0E-06
-1.0E-06
I(A)
3
4
5
6
E(V)
Comparative Example 1
Example 1
Example 5
Example 3

COMPOSITE, POLYMER ELECTROLYTE, ELECTROCHEMICAL DEVICE, POLYMER-BASED SOLID-STATE BATTERY, AND ACTUATOR

CROSS REFERENCE TO RELATED APPLICATIONS

This application is a National Stage of International Application No. PCT/JP2021/017014, filed Apr. 28, 2021, claiming priority to Japanese Patent Application No. 2020-081427, filed May 1, 2020.

TECHNICAL FIELD

The present disclosure relates to a composite, a polymer electrolyte, an electrochemical device, a polymer-based solid-state battery, and an actuator.

BACKGROUND ART

In recent years, solid-state electrolytes having high ion-conducting property comparable to non-aqueous electrolytic solution have been developed, and the development for practical use of all solid-state batteries has been accelerated.

Patent Document 1 discloses a polymer electrolyte in which a vinylidene copolymer consisting of 35 to 99 mol % of a repeating unit derived from vinylidene fluoride, 1 to 50 mol % of a repeating unit derived from tetrafluoroethylene, and 0 to 20 mol % of a monomer copolymerizable with these and having a melting point of 80° C. or more and a crystallinity of 20 to 80% is impregnated with a non-aqueous electrolyte.

Patent Document 2 discloses a composition comprising a vinylidene fluoride-tetrafluoroethylene copolymer obtained by copolymerizing 1 to 15 mass % of tetrafluoroethylene and an organic solvent capable of dissolving a lithium salt.

Patent Document 3 discloses a fluorine-containing copolymer essentially containing a copolymer of a fluoromonomer and a polymerizable vinyl compound having an amide group.

Patent Document 4 discloses a fluorine-containing copolymer consisting of a polymerization unit based on a fluorine-containing monomer and a polymerization unit having a $—SO_3Li$ group in the side chain.

Patent Document 5 discloses a polymer having a fluorine-containing olefin unit and a vinyl alcohol unit.

RELATED ART

Patent Documents

Patent Document 1: International Publication No. 1999/028916

Patent Document 2: Japanese Patent Laid-Open No. 2001-35534

Patent Document 3: International Publication No. 2016/133206

Patent Document 4: Japanese Patent Laid-Open No. 2011-174032

Patent Document 5: Japanese Patent Laid-Open No. 2014-168951

SUMMARY OF THE INVENTION

Problem to be Solved by the Invention

It is an object of the present disclosure to provide a composite that can be suitably used as an electrolyte in polymer-based solid-state batteries, and various electrochemical devices using the composite.

Means for Solving the Problem

The present disclosure is a composite comprising a fluorine-containing copolymer, an alkali metal salt, and an ionic liquid, wherein the fluorine-containing copolymer essentially comprises: a structural unit represented by formula (1):

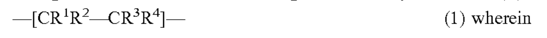

$$—[CR^1R^2—CR^3R^4]— \quad (1)$$

wherein $R^1$ to $R^4$ are each independently H, F, Cl, $CF_3$, or $OR^{10}$, where $R^{10}$ is an organic group having 1 to 8 carbon atoms, provided that at least one of $R^1$ to $R^4$ is F; and a structural unit represented by formula (2):

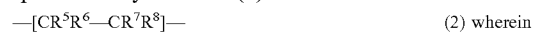

$$—[CR^5R^6—CR^7R^8]— \quad (2)$$

wherein $R^5$ to $R^8$ are each independently H, F, an alkyl group having 1 to 3 carbon atoms, a functional group containing a heteroatom other than the fluorine atom, or a group containing the functional group, provided that at least one of $R^5$ to $R^8$ is a functional group containing a heteroatom other than the fluorine atom or a group containing the functional group, and the volatile content is 0.1 mass % or less with respect to the entire composite.

The structural unit represented by formula (1) is preferably a tetrafluoroethylene unit.

The structural unit represented by formula (2) is preferably at least one selected from the group consisting of vinylpyrrolidone, vinyl alcohol, a monomer represented by formula (3), and a monomer represented by formula (4), and a monomer represented by formula (5).

[Formula 1]

(3)

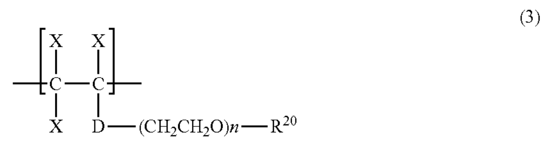

In formula (3), X represents H or F, n represents an integer of 1 to 8, and $R^{20}$ represents H or an alkyl group having 1 to 10 carbon atoms.

[Formula 2]

(4)

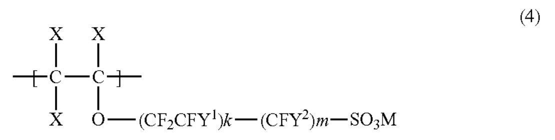

In formula (4), X represents H or F, $Y^1$ represents F, Cl, or $CF_3$, $Y^2$ represents F or Cl, k and m each represent an integer of 0 to 2, and M represents an alkali metal.

[Formula 3]

(5)

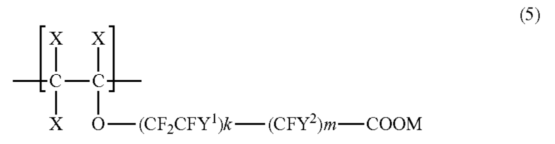

In formula (5), X represents H or F, $Y^1$ represents F, Cl, or $CF_3$, $Y^2$ represents F or Cl, k and m each represent an integer of 0 to 2, and M represents an alkali metal.

The fluorine-containing copolymer preferably has a composition range with a content of the structural unit represented by formula (1) of 1 to 60 mol % and a content of the structural unit represented by formula (2) of 40 to 99 mol %.

The fluorine-containing copolymer may have a cross-linked chain.

The alkali metal salt is preferably at least one lithium salt selected from $LiPF_6$, $LiBF_4$, LiTFSI, LiFSI, $LiPO_2F_2$, and LiBOB.

The alkali metal salt is preferably contained in a proportion of 0.1 to 90 mass % with respect to the fluorine-containing copolymer.

The ionic liquid is preferably at least one selected from combinations of 1-butyl-3-methyl imidazolium (BMI) cation or N-methyl-N-butyl-pyrrolidium (Pyr14) cation as an organic cation and $BF_4$ anion or bis(trifluoromethanesulfonyl) imide (TFSI) anion as an anion.

The ionic liquid is preferably contained in a proportion of 1.0 to 500 mass % with respect to the fluorine-containing copolymer.

The composite is preferably flame retardant.

The present disclosure is also a polymer electrolyte consisting of the composite.

The present disclosure is also an electrochemical device comprising the polymer electrolyte.

The present disclosure is also a polymer-based solid-state battery comprising the polymer electrolyte.

The polymer-based solid-state battery is preferably a lithium ion secondary battery.

The present disclosure is also an actuator comprising the polymer electrolyte.

Effect of Invention

The composite of the present disclosure can be suitably used as an electrolyte in an electrochemical device such as a solid-state secondary battery, since it is a copolymer composition that is excellent in oxidation resistance, flame retardancy, and the like.

BRIEF DESCRIPTION OF DRAWINGS

The FIGURE shows the evaluation results for oxidation resistance in the examples.

DESCRIPTION OF EMBODIMENTS

Hereinafter, the present disclosure will be described in detail.

In recent years, polymer-based solid-state batteries have been developed as a type of solid-state batteries. Such a polymer-based solid-state battery generally comprises a polymer electrolyte consisting of a polymer, an electrolyte, an additive, a plasticizer, an electrolytic solution, and the like, and has an advantage of high safety due to no risk of leakage.

Fluorine-containing polymers have also been developed as polymers used in the polymer electrolyte. A fluorine-containing polymer is a component excellent in oxidation resistance, flame retardancy, and the like, and thus has advantages such as being difficult to ignite and being applicable to the roll-to-roll system. An object of the present disclosure is to develop a composite that has performance as a fluorine-containing polymer and is excellent in flame retardancy.

(Fluorine-Containing Copolymer)

The composite of the present disclosure comprises a fluorine-containing copolymer that essentially comprises: a structural unit represented by formula (1):

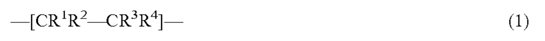

$$—[CR^1R^2—CR^3R^4]— \quad (1)$$

wherein $R^1$ to $R^4$ are each independently H, F, Cl, $CF_3$, or $OR^{10}$, where $R^{10}$ is an organic group having 1 to 8 carbon atoms, but free of a heteroatom other than fluorine, provided that at least one of $R^1$ to $R^4$ is F; and a structural unit represented by formula (2):

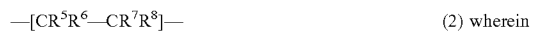

$$—[CR^5R^6—CR^7R^8]— \quad (2)$$

wherein $R^5$ to $R^8$ are each independently H, F, an alkyl group having 1 to 3 carbon atoms, a functional group containing a heteroatom other than the fluorine atom, or a group containing the functional group, provided that at least one of $R^5$ to $R^8$ is a functional group containing a heteroatom other than the fluorine atom or a group containing the functional group.

A polymer having a structural unit having a functional group containing a heteroatom has a good ability to dissolve an alkali metal salt. This enables a composite having excellent performance as a polymer electrolyte to be obtained. Further, such a polymer electrolyte can be suitably used in various electrochemical devices.

The structural unit represented by formula (1) in the present disclosure is a structure derived from common monomers widely used in fluororesins. Specific examples of the structural unit can include tetrafluoroethylene, vinylidene fluoride, perfluoroalkyl vinyl ether, hexafluoropropylene, chlorotrifluoroethylene, and vinyl fluoride.

The polymer of the present disclosure is a copolymer using the structural unit represented by formula (2) with the structural unit represented by formula (1) in combination.

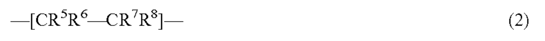

$$—[CR^5R^6—CR^7R^8]— \quad (2)$$

The structural unit represented by formula (2) has a functional group having a heteroatom. The structural unit represented by formula (1) does not fall under the structural unit represented by formula (2).

The heteroatom may be other than the fluorine atom but is preferably a heteroatom other than a halogen atom, more preferably two or less selected from the group consisting of the oxygen atom, the nitrogen atom, the sulfur atom, the silicon atom, the boron atom, and the phosphorus atom, further preferably two or less selected from the group consisting of the oxygen atom, the nitrogen atom, the sulfur atom, and the silicon atom, particularly preferably two or less selected from the group consisting of the oxygen atom and the nitrogen atom.

The "two or less" means one or two.

Further, one functional group may contain a plurality of heteroatoms of the same type. Further, the "heteroatom" is other than the fluorine atom, and the "functional group having a heteroatom" may contain both a "heteroatom" and the fluorine atom.

The presence of such a functional group having a heteroatom enhances the affinity between the fluorine-containing polymer and the alkali metal salt or the ionic liquid and allows a solid-state electrolyte having good electric conductivity to be obtained.

Examples of the functional group having a heteroatom include a hydroxyl group (excluding hydroxyl groups in the carboxyl group; the same applies to the following description), a carboxyl group, a urethane group, an amide group, a carbonyl group, a carbonate group, an ester group, an ether group, an amino group, an isocyanate group, a group represented by —COOCO—, a mercapto group, a silyl group, a silanate group, an epoxy group, and a cyano group.

Among these, the functional group is preferably at least one selected from the group consisting of a hydroxyl group, an amide group, an ether group, and an ester group.

The functional group having a heteroatom has a structure derived from a monomer having a functional group having a heteroatom. Hereinafter, the structure of formula (2) in each of a hydroxyl group, an amide group, an ether group, and an ester group, which are particularly suitable functional groups, will be described in detail as a structure of each derived monomer.

Examples of the amide group-containing monomer include N-vinyl lactam compounds such as N-vinyl-β-propiolactam, N-vinyl-2-pyrrolidone, N-vinyl-γ-valerolactam, N-vinyl-2-piperidone, and N-vinyl-heptolactam, acyclic N-vinyl amide compounds such as N-vinyl formamide and N-methyl-N-vinylacetamide, acyclic N-allylamide compounds such as N-allyl-N-methylformamide and allyl urea, N-allyllactam compounds such as 1-(2-propenyl)-2-pyrrolidone, and acrylamide compounds such as (meth)acrylamide, N,N-dimethylacrylamide, and N-isopropyl acrylamide.

Alternatively, examples of the amide group-containing monomer include a compound represented by formula (6) below:

[Formula 4]

(6)

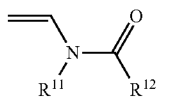

wherein $R^{11}$ and $R^{12}$ are each independently H or an alkyl group having 1 to 10 carbon atoms, and $R^{11}$ and $R^{12}$ may be bound together to form a ring.

Among these, the amide group-containing monomer is preferably N-vinyl lactam compounds or acyclic N-vinyl amide compounds, more preferably at least one selected from the group consisting of N-vinyl-β-propiolactam, N-vinyl-2-pyrrolidone, N-vinyl-γ-valerolactam, N-vinyl-2-piperidone, and N-vinyl-heptolactam, further preferably at least one selected from the group consisting of N-vinyl-2-pyrrolidone, and N-vinyl-2-piperidone, particularly preferably N-vinyl-2-pyrrolidone.

The ether group-containing monomer excludes a functional group represented by $OR^{10}$ in formula (1) above. Further, the hydrogen atoms of the ether group each are partially or fully optionally substituted with the fluorine atom.

The ether group-containing monomer is preferably a structure derived from at least one selected from the group consisting of a monomer represented by formula (3), a monomer represented by formula (4), and a monomer represented by formula (5).

[Formula 5]

(3)

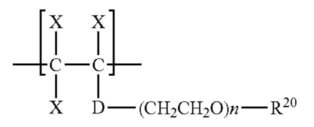

In formula (3), X represents H or F, n represents an integer of 1 to 8, and $R^{20}$ represents H or an alkyl group having 1 to 10 carbon atoms.

[Formula 6]

(4)

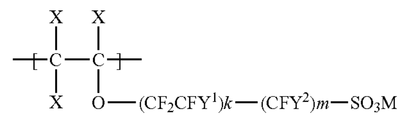

In formula (4), X represents H or F, $Y^1$ represents F, Cl, or $CF_3$, $Y^2$ represents F or Cl, k and m each represent an integer of 0 to 2, and M represents an alkali metal.

[Formula 7]

(5)

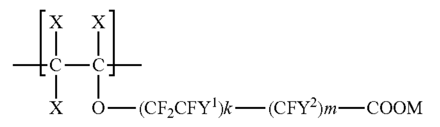

In formula (5), X represents H or F, $Y^1$ represents F, Cl, or $CF_3$, $Y^2$ represents F or Cl, k and m each represent an integer of 0 to 2, and M represents an alkali metal.

Examples of a monomer that gives the structure represented by formula (3) can include 2-hydroxyethyl vinyl ether, diethylene glycol monovinyl ether, triethylene glycol monovinyl ether, tetraethylene glycol monovinyl ether, pentaethylene glycol monovinyl ether, hexaethylene glycol monovinyl ether, heptaethylene glycol monovinyl ether, octaethylene glycol monovinyl ether, 2-methoxyethyl vinyl ether, diethylene glycol methyl vinyl ether, triethylene glycol methyl vinyl ether, tetraethylene glycol methyl vinyl ether, pentaethylene glycol methyl vinyl ether, hexaethylene glycol methyl vinyl ether, heptaethylene glycol methyl vinyl ether, and octaethylene glycol methyl vinyl ether.

Examples of a monomer that gives the structure represented by formula (4) can include lithium trifluorovinyloxytetrafluoroethane sulfonate ($CF_2CFOCF_2CF_2SO_3Li$).

Examples of a monomer that gives the structure represented by formula (5) can include lithium trifluorovinyloxytetrafluoropropanoate ($CF_2CFOCF_2CF_2COOLi$).

The fluorine-containing copolymer preferably contains 99.9 to 0.1 mol % of the structural unit represented by formula (1) (which will be hereinafter referred to as a structural unit (1)) and 0.1 to 99.9 mol % of the structural unit represented by formula (2) (which will be hereinafter referred to as a structural unit (2)), with respect to all structural units, for further improving the ion-conducting property and the voltage resistance. Further, the structural unit (1) is more preferably 65 to 7 mol %, and the structural unit (2) is more preferably 35 to 93 mol %. Further, the structural unit (1) is further preferably 55 to 15 mol %, and the structural unit (2) is further preferably 45 to 85 mol %.

Further, the structural unit (1) is particularly preferably 50 to 20 mol %, and the structural unit (2) is particularly preferably 50 to 80 mol %.

In particular, the molar ratio of the structural unit (1) to the structural unit (2) ((1)/(2)) is preferably in the range of 0.07 to 1.86, more preferably in the range of 0.17 to 1.23. It is further preferably in the range of 0.25 to 1.00.

The fluorine-containing copolymer above may substantially consist only of the structural units (1) and (2).

The fluorine-containing copolymer may have another structural unit than the structural units (1) and (2), as long as the effects of the composite of the present disclosure not impaired. Examples of the other structural unit include structural units based on structures derived from another fluoromonomer than the structure represented by formula (1), a functional group-containing monomer other than the hetero group-containing monomer mentioned above, an olefin free from halogen atoms and hydroxyl groups, a vinyl monomer with a long-chain hydrocarbon group, and the like. The total of the other structural units may be 0 to 50 mol %, 0 to 40 mol %, 0 to 30 mol %, 0 to 15 mol %, or 0 to 5 mol %.

Examples of the other fluoromonomer that gives the structure other than the structural units (1) and (2) include (1) an olefin having the fluorine atom bound to the $sp^2$ hybrid carbon atom and having 3 or more carbon atoms, however, excluding monomers that give the structural units (1) and (2), (2) a monomer represented by formula: $CH_2{=}CH{-}Rf$, wherein Rf is a fluoroalkyl group, and (3) a monomer represented by formula: $CH_2{=}CH{-}ORf$, wherein Rf is a fluoroalkyl group.

The fluoroalkyl group above is preferably a linear or branched fluoroalkyl group having 1 to 12 carbon atoms.

The other fluoromonomer is preferably trifluorostyrene, a fluoromonomer represented by formula: $CH_2{=}CFRf^1$, wherein $Rf^1$ is a linear or branched fluoroalkyl group having 1 to 12 carbon atoms, fluoroalkyl vinyl ether, fluoroalkyl ethylene, trifluoropropylene, pentafluoropropylene, trifluorobutene, tetrafluoroisobutene, hexafluoroisobutene, trifluorostyrene, or the like.

Examples of the olefin free from halogen atoms and hydroxyl groups include fluorine-free olefins such as ethylene, propylene, n-butene, and isobutene.

In the present disclosure, those using the structural unit represented by formula (2) as a copolymer component in known fluoropolymers based on the structural unit represented by formula (1) are preferable. Therefore, those containing a copolymer resin that uses the structural unit represented by formula (1) as a basic skeleton may be used.

The fluorine polymer containing the structural unit represented by formula (1) as a basic skeleton that can be widely used may be a polymer having the fluorine atom. Examples thereof include fluororesins such as polytetrafluoroethylene, polyvinylidene fluoride, tetrafluoroethylene [TFE]/perfluoro(alkyl vinyl ether) [PAVE] copolymer [PFA], TFE/hexafluoropropylene [HFP] copolymer [FEP], ethylene [Et]/TFE copolymer [ETFE], Et/TFE/HFP copolymer [EFEP], polychlorotrifluoroethylene [PCTFE], chlorotrifluoroethylene [CTFE]/TFE copolymer, Et/CTFE copolymer, polyvinyl fluoride [PVF], polyvinylidene fluoride [PVdF], vinylidene fluoride [VdF]/TFE copolymer, VdF/HFP copolymer, VdF/TFE/HFP copolymer, VdF/HFP/(meth)acrylic acid copolymer, VdF/CTFE copolymer, VdF/pentafluoropropylene copolymer, and VdF/PAVE/TFE copolymer; and fluoropolymers such as vinylidene fluoride [VdF] fluoropolymer, tetrafluoroethylene [TFE]/propylene [Pr] fluoropolymer, TFE/Pr/VdF fluoropolymer, ethylene [Et]/hexafluoropropylene [HFP] fluoropolymer, Et/HFP/VdF fluoropolymer, Et/HFP/TFE fluoropolymer, perfluoroelastomer, fluorosilicone fluoropolymer, and fluorophosphazene fluoropolymer. One or more of these can be used.

Among these, use of tetrafluoroethylene as a basic skeleton is particularly preferable.

The fluorine-containing copolymer contained in the composite of the present disclosure may have a crosslinked chain. Those having a crosslinked chain are preferable since the film strength can be maintained. In particular, polymers such as vinylpyrrolidone and triethylene glycol monovinyl ether tend to have a decreased strength and therefore preferably partially has a crosslinked chain.

The fluorine-containing copolymer preferably has a number-average molecular weight of 10,000 to 1,200,000. When the number-average molecular weight is over 1,200,000, the dissolution viscosity significantly increases, resulting in poor processability or a decrease in electrical conductivity of the polymer electrolyte, which is not preferable. Meanwhile, when it falls below 10,000, the mechanical strength of the polymer electrolyte significantly decreases, which is not preferable. The number-average molecular weight is particularly preferably 40,000 to 1,100,000.

The number-average molecular weight is a value measured by GPC (gel permeation chromatography), and the number-average molecular weight can be calculated, for example, based on standard polystyrene by the method shown below. GPC can be performed using HLC-8020, available from Tosoh Corporation, three polystyrene gel MIX columns (GMH Series with a size of 30 cm, available from Tosoh Corporation) as columns, and an NMP (containing 5 mmol/L of LiBr) solvent at 40° C. and a flow rate of 0.7 mL/minute. It can be performed with a sample concentration of 0.1 mass % and an amount to be charged of 500 μL. The number-average molecular weight (in terms of polystyrene) of the fluorine-containing copolymer is preferably 10,000 to 1,200,000, more preferably 40,000 to 1,100,000.

Use of such a fluorine polymer as a basic skeleton enables a solid-state electrolyte that is excellent in performance such as flame retardancy and oxidation resistance to be obtained.

In the present disclosure, the compositional features of the fluorine-containing copolymer can be measured, for example, by $^{19}F$-NMR measurement.

The method for producing the fluorine-containing polymer is not limited and can be performed by radical polymerization of the fluorine-containing polymer targeting each monomer described above.

The radical polymerization is preferably performed by adding a polymerization initiator. The polymerization initiator is not limited, as long as it can generate radicals at the polymerization temperature, and known oil-soluble and/or water-soluble polymerization initiators can be used. Further, a redox initiator may be used. The concentration of the polymerization initiator is appropriately determined depending on the desired molecular weight and reaction rate of the fluorine-containing copolymer.

The amount of the radical polymerization initiator to be added is not limited, but it may be added in an amount in which the polymerization rate does not significantly decrease (for example, several ppm against the water concentration) or more all at once at the beginning of the polymerization, sequentially, or continuously. The upper limit is a range in which the heat of the polymerization reaction can be removed from the apparatus.

The surfactant that can be used can be a generally known material such as a nonionic surfactant, an anionic surfactant, and a cationic surfactant. The amount to be added (to polymerization water) is preferably 10 to 5,000 ppm. More preferably, it is 50 to 5,000 ppm.

The solvent is preferably a solvent having no chain transfer property. In the case of emulsion polymerization and suspension polymerization, examples thereof include water, a mixture of water and a water-soluble organic solvent, or a mixture of water and a water-insoluble organic solvent.

In the polymerization, examples of the chain transfer agent include isopentane, methane, ethane, propane, isopropanol, acetone, various mercaptans, carbon tetrachloride, and cyclohexane, in addition to esters such as dimethyl malonate, diethyl malonate, methyl acetate, ethyl acetate, butyl acetate, and dimethyl succinate.

The chain transfer agent to be used may be a bromine compound or an iodine compound. Examples of the polymerization method using the bromine compound or the iodine compound include a method of performing emulsion polymerization in a water medium while applying a pressure in the presence of the bromine compound or the iodine compound in a substantially anoxic state (iodine transfer polymerization method). Typical examples of the bromine compound or the iodine compound to be used include a compound represented by formula:

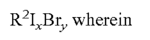

$R^2I_xBr_y$ wherein x and y each are an integer of 0 to 2, and $1 \le x+y \le 2$ is satisfied, $R^2$ is a saturated or unsaturated fluorohydrocarbon group or a chlorofluorohydrocarbon group having 1 to 16 carbon atoms, or a hydrocarbon group having 1 to 3 carbon atoms, and the oxygen atom may be contained. Use of the bromine compound or the iodine compound allows iodine or bromine to be introduced into the polymer, thereby giving a function as a crosslinking point.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, a monoiodomonobromo substitute of benzene, a diiodomonobromo substitute, and (2-iodoethyl) and (2-bromo ethyl) substitutes. One of these compounds may be used alone or used in combination.

Among these, 1,4-diiodoperfluorobutane, 1,6-diiodoperfluorohexane, and 2-iodoperfluoropropane are preferably used, in view of the polymerization reactivity, the crosslinking reactivity, and the availability.

The fluorine-containing copolymer may be in any form such as an aqueous dispersion or powder. In the case of emulsion polymerization, the copolymer powder can be obtained by coagulating the dispersion as polymerized, followed by washing with water, dehydrating and drying. Coagulation can be performed by adding an inorganic salt such as aluminum sulfate or an inorganic acid, applying a mechanical shearing force, or freezing the dispersion. In the case of suspension polymerization, it can be obtained by recovering a suspension from the dispersion as polymerized, followed by drying. In the case of solution polymerization, it can be obtained by drying the solution containing the fluorine-containing polymer as it is or adding a poor solvent dropwise for purification.

As described above, the fluorine-containing copolymer may have a crosslinked chain. The method for forming those having a crosslinked chain is not limited, but a crosslinked chain may be formed, for example, by mixing a crosslinking initiator with a polymer, followed by heating or irradiation with light in any step of forming the composite.

The crosslinking initiator that can be used may be a crosslinking initiator that is commonly used in crosslinking. Specifically, examples thereof include acetophenone initiators such as hydroxyacetophenones including 2-hydroxy-2-methyl-1-phenylpropane-1-one, 1-(4-isopropylphenyl)-2-hydroxy-2-methylpropane-1-one, and 1-hydroxycyclohexyl phenyl ketone; aminophenone initiators; benzoin initiators such as benzoin, benzoin ether, and benzyl dimethyl ketal; benzophenone initiators such as benzophenone, benzoyl benzoic acid, hydroxybenzophenone, 4-phenyl benzophenone, and acrylated benzophenone; thioxanthone initiators such as thioxanthone, 2-methylthioxanthone, and 2,4-dimethylthioxanthone; and α-acyloxime ester, acylphosphine oxide, benzyl, Camphorquinone, 2-ethyl anthraquinone, and Michler's ketone, in addition to acetophenones such as chloroacetophenone, diethoxyacetophenone, and α-aminoacetophenone.

The amount of the crosslinking initiator to be mixed in the fluoropolymer composition is preferably 0.05 to 10 parts by mass with respect to 100 parts by mass of the crosslinkable fluoropolymer. The amount of the crosslinking initiator to be mixed falling within such a range enables crosslinking to sufficiently proceed. The amount is more preferably 1 to 5 parts by mass.

The fluoropolymer composition preferably further contains a photosensitizer, a surfactant, or the like, as required.

The photosensitizer is preferably used in the case where the photocrosslinking initiator is a benzophenone initiator or a thioxanthone initiator, and examples of the photosensitizer include aliphatic amine photosensitizers such as triethanolamine, methyl diethanolamine, and triisopropanolamine; aromatic amine photosensitizers such as 4,4'-diethylaminophenone, ethyl 4-dimethylaminobenzoate, and (n-butoxy) ethyl 4-dimethylaminobenzoate, and 2,4-diethylthioxanthone in addition.

The amount of the photosensitizer to be mixed when adding a photosensitizer to the fluoropolymer composition is preferably 0.05 to 20 parts by mass, more preferably 0.1 to 10 parts by mass, further preferably 0.5 to 5 parts by mass, with respect to 100 parts by mass of the photocrosslinkable fluoropolymer.

The fluorine-containing copolymers may be used alone, or in combination of two or more. In particular, two types of copolymers having different molecular structures may be used in combination in some embodiments. Examples of the embodiments in which two types of copolymers having different molecular structures are used in combination include an embodiment using two copolymers (I) having different molecular structures, an embodiment using two copolymers (II) having different molecular structures, and an embodiment using one copolymer (I) and one copolymer (II) in combination.

(Alkali Metal Salt)

The composite of the present disclosure comprises an alkali metal salt.

The alkali metal salt can be expressed as MX, wherein M represents an alkali metal, and X represents a substance serving as a counter anion. The alkali metal salt may be used alone, or two or more of them may be used in the form of a mixture.

The alkali metal salt is particularly preferably a lithium salt (that is, a compound represented by LiX).

Any lithium salt can be used, and specific examples are as follows. For example, inorganic lithium salts such as $LiPF_6$, $LiBF_4$, $LiClO_4$, $LiAlF_4$, $LiSbF_6$, $LiTaF_6$, $LiWF_7$, $LiAsF_6$, $LiAlCl_4$, LiI, LiBr, LiCl, $LiB_{10}Cl_{10}$, $Li_2SiF_6$, $Li_2PFO_3$, and $LiPO_2F_2$; lithium tungstates such as $LiWOF_5$; lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$; lithium salts having an S=O group such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, $CF_3CF_2CF_2CF_2SO_3Li$, lithium methyl sulfate, lithium ethyl sulfate ($C_2H_5OSO_3Li$), and lithium 2,2,2-trifluoroethyl sulfate; lithium imide salts such as LiTFSI, LiFSI, $LiN(FCO)_2$, $LiN(FCO)\ (FSO_2)$, $LiN(FSO_2)_2$, $LiN(FSO_2)(CF_3SO_2)$, $LiN(CF_3SO_2)$ 2, LiN $(C_2F_5SO_2)$ 2, lithium bisperfluoroethanesulfonylimide, lithium cyclic 1,2-perfluoroethanedisulfonylimide, lithium cyclic 1,3-perfluoropropanedisulfonylimide, lithium cyclic 1,2-ethanedisulfonylimide, lithium cyclic 1,3-propanedisulfonylimide, lithium cyclic 1,4-perfluorobutanedisulfonylimide, $LiN(CF_3SO_2)\ (FSO_2)$, $LiN(CF_3SO_2)(C_3F_7SO_2)$, $LiN(CF_3SO_2)(C_4F_9SO_2)$, and $LiN(POF_2)_2$; lithium methide salts such as $LiC(FSO_2)_3$, $LiC(CF_3SO_2)_3$, and LiC $(C_2F_5SO_2)_3$; other fluorine-containing organic lithium salts such as a salt represented by formula: $LiPF_a(C_nF_{2n+1})_{6-a}$, wherein a is an integer of 0 to 5, and n is an integer of 1 to 6, (for example, $LiPF_3(C_2F_5)_3$, $LiPF_3\ (CF_3)$ 3, $LiPF_3$ (iso-$C_3F_7$) 3, $LiPF_5$(iso-$C_3F_7$), $LiPF_4\ (CF_3)$ 2, $LiPF_4(C_2F_5)_2$), $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2\ (CF_3)_2$, $LiBF_2\ (C_2F_5)_2$, $LiBF_2\ (CF_3SO_2)_2$, and $LiBF_2\ (C_2F_5SO_2)$ 2; LiBOB, LiTDI, LiSCN, $LiB(CN)_4$, $LiB(C_6H_5)_4$, $Li_2\ (C_2O_4)$, $LiP(C_2O_4)_3$, $Li_2B_{12}F_bH_{12-b}$ (b is an integer of 0 to 3), and the like, can be mentioned.

Among them, $LiPF_6$, $LiBF_4$, $LiSbF_6$, $LiTaF_6$, $LiPO_2F_2$, $FSO_3Li$, $CF_3SO_3Li$, $LiN(FSO_2)_2$, $LiN(FSO_2)\ (CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, LiC $(C_2F_5SO_2)_3$, $LiBF_3CF_3$, $LiBF_3C_2F_5$, $LiPF_3(CF_3)_3$, $LiPF_3$ $(C_2F_5)_3$, LiTFSI, LiFSI, LiBOB, LiTDI, and the like, are particularly preferable due to their effects of improving the output characteristics, the high rate charge/discharge characteristics, the high-temperature storage characteristics, the cycle characteristics, and the like, and at least one lithium salt selected from the group consisting of $LiPF_6$, $LiBF_4$, LiTFSI, LiFSI, $LiPO_2F_2$, and LiBOB is most preferable.

These electrolyte salts may be used alone, or in combination of two or more. Preferable examples in the case of using two or more in combination include a combination of $LiPF_6$ and $LiBF_4$ or a combination of LiTFSI and LiFSI, since they have an effect of improving the high-temperature storage characteristics, the load characteristics, and the cycle characteristics.

In the composite of the present disclosure, the amount of the alkali metal salt to be mixed is preferably 0.1 mass % or more, more preferably 1.0 mass % or more, with respect to 100 mass % of the entire composite. Further, the amount is preferably 90 mass % or less, more preferably 80 mass % or less, further preferably 70 mass % or less, particularly preferably 5 mass % or less.

Further, another example is a combination of an inorganic lithium salt and an organic lithium salt, and the combination of these two has an effect of suppressing the deterioration due to high-temperature storage. Preferable examples of the organic lithium salt include $CF_3SO_3Li$, $LiN(FSO_2)_2$, LiN $(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, LiC $(CF_3SO_2)$ 3, $LiC(C_2F_5SO_2)_3$, $LiBF_3CF_3$, $LiBF_3C_2F_5$, $LiPF_3$ $(CF_3)_3$, and $LiPF_3(C_2F_5)_3$. In such a case, the proportion of the organic lithium salt is preferably 0.1 mass % or more, particularly preferably 0.5 mass % or more, and preferably 30 mass % or less, particularly preferably 20 mass % or less, with respect to 100 mass % of the entire composite.

The concentration of such an alkali metal salt in the composite is not limited as long as the effects of the present disclosure are not impaired. For achieving the electric conductivity of the composite falling within a good range and ensuring good battery performance, the total molar concentration of lithium in the composite is preferably 0.3 mol/L or more, more preferably 0.4 mol/L or more, further preferably 0.5 mol/L or more, and preferably 5.0 mol/L or less, more preferably 4.5 mol/L or less, further preferably 4.0 mol/L or less.

When the total molar concentration of lithium is excessively low, the electric conductivity of the composite may be insufficient, whereas when the concentration is excessively high, the electrical conductivity may decrease due to an increase in viscosity, which may result in a decrease in battery performance.

(Ionic Liquid)

The composite of the present disclosure further comprises an ionic liquid.

The "ionic liquid" is a liquid consisting of ions combining organic cations with anions. Containing the ionic liquid can increase the ion conductivity. Negligible vapor pressure and non-flammability are also desirable features.

Examples of the organic cations include, but are not limited to, imidazolium ions such as dialkyl imidazolium cation and trialkyl imidazolium cation; tetraalkylammonium ions; alkylpyridinium ions; dialkylpyrrolidinium ions; and dialkylpiperidinium ions.

Examples of the counter anions of these organic cations include, but are not limited to, $PF_6$ anion, $PF_3(C_2F_5)_3$ anion, $PF_3(CF_3)_3$ anion, $BF_4$ anion, $BF_2(CF_3)_2$ anion, $BF_3(CF_3)$ anion, bisoxalato borate anion, $P(C_2O_4)F_2$ anion, Tf (trifluoromethanesulfonyl) anion, Nf (nonafluorobutanesulfonyl) anion, bis(fluorosulfonyl) imide anion, bis(trifluoromethanesulfonyl) imide (TFSI) anion, bis (pentafluoroethanesulfonyl) imide anion, dicyanoamine anion, and halide anion.

The ionic liquid is preferably at least one selected from combinations of 1-butyl-3-methyl imidazolium (BMI) cation or N-methyl-N-butyl-pyrrolidium (Pyr14) cation, as an organic cation, and $BF_4$ anion, or bis(trifluoromethanesulfonyl) imide (TFSI) anion, as an anion.

Among these, TFSI is particularly preferable.

Preferably, the ionic liquid does not fall under plastic crystals. Plastic crystals mean crystals in a state of having regularity in the three-dimensional position but no regularity in the orientation of particles.

The content of the ionic liquid is preferably 1.0 to 500 mass % with respect to the fluorine-containing copolymer. The lower limit is more preferably 10 mass %, and the upper limit is more preferably 300 mass %.

(Other Additives)

For improving the electric conductivity, metal fillers such as $TiO_2$ and $Al_2O_3$ may be added as other additives. The content of the additive is preferably 0.1 to 10 mass % with respect to the fluorine-containing copolymer. It is more preferably 0.2 to 5 mass %.

The composite of the present disclosure contains 0.1 mass % or less of volatile components with respect to the entire composite. Containing such an extremely low amount of volatile components gives an advantage of long-term reliability.

The composite of the present disclosure is preferably flame retardant. The flame retardant property is particularly preferable since it allows safe use in various electrochemical devices.

"Flame retardant" means that the evaluation result of "No flame transferred from naked flame" is obtained in the evaluation of flame retardancy in Examples, which will be described later in detail.

Setting the volatile content to 0.1 mass % or less gives excellent oxidation resistance, excellent flame retardancy, excellent heat resistance, and excellent film-forming property, as well as high ion-conducting property. Polymer compositions that have been used as electrolytes for polymer-based solid-state batteries up to now have a volatile content of about 10 mass %, which is higher than that of the composite of the present disclosure. Therefore, there have been disadvantages such as limited operating temperature range and poor long-term reliability.

The method for adjusting the volatile content in the composite within such a range is not limited, and examples thereof can include a method of heating the composite film obtained as a thin film under reduced pressure, followed by drying.

The volatile content in the present disclosure is a value determined by the later-described method in Examples.

(Production Method)

The method for producing the composite is not limited, and any method can be used for preparation. For example, it can be obtained by slurrying the fluorine-containing copolymer, the alkali metal salt, and the ionic liquid, and an additive and the like, as required, with a solvent and applying the slurry obtained into a thin film, followed by drying.

The type of the solvent for forming such a slurry is not limited, as long as it is a solvent capable of dissolving or dispersing the components. Any of aqueous solvents and organic solvents may be used. Examples of the aqueous solvents include water and a mixed solvent of an alcohol and water. Examples of the organic solvents include aliphatic hydrocarbons such as hexane; aromatic hydrocarbons such as benzene, toluene, xylene, and methyl naphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropyl amine; ethers such as diethyl ether, propylene oxide, and tetrahydrofuran (THF); amides such as N-methylpyrrolidone (NMP), dimethylformamide, and dimethylacetamide; and polar aprotic solvents such as hexamethylphosphamide and dimethylsulfoxide.

(Electrochemical Device)

The composite of the present disclosure can be suitably used as an electrolyte for various electrochemical devices. An electrochemical device including a polymer electrolyte consisting of the composite is also one aspect of the present disclosure.

The electrochemical device is not limited and can be one of conventionally known electrochemical devices. Specifically, secondary batteries such as lithium ion batteries, primary batteries such as lithium batteries, sodium ion batteries, magnesium ion batteries, radical batteries, solar cells (especially dye-sensitized solar cells), fuel cells; capacitors such as lithium ion capacitors, hybrid capacitors, electrochemical capacitors, and electric double-layer capacitors; actuators such as cylinders, swing motors, and motors; various condensers such as aluminum electrolytic condensers and tantalum electrolytic condensers; and electronic elements, electrochemical switching elements, various electrochemical sensors, and the like, can be mentioned.

Among these, since it has a high capacity and a large output, the composite can be suitably used for secondary batteries that undergo a large volume change due to movement of a large amount of metal ions.

(Secondary Solid-State Battery)

The present disclosure is also a secondary solid-state battery comprising the composite of the present disclosure as a polymer electrolyte.

The secondary solid-state battery of the present disclosure is a polymer-based solid-state battery comprising: a positive electrode and a negative electrode, each consisting of a positive electrode active material or a negative electrode active material, a binder, and a current collector; and a polymer electrolyte layer consisting of the composite interposed between the positive electrode and the negative electrode. The secondary solid-state battery is preferably a lithium ion battery.

The positive electrode active material and the negative electrode active material are not limited, and examples thereof can include those used for known electrochemical devices such as secondary batteries including lead batteries, nickel-cadmium batteries, nickel-hydrogen batteries, lithium ion batteries, and alkali metal sulfur batteries, and electric double-layer capacitors.

(Positive Electrode)

The positive electrode active material is not limited, and examples thereof can include those used for known electrochemical devices. Specifically, the positive electrode active material of a lithium ion secondary battery is not limited, as long as it is capable of electrochemically absorbing/desorbing lithium ions. Examples thereof include a lithium-containing transition metal composite oxide, a lithium-containing transition metal phosphate compound, a sulfur material, and an electrically conductive polymer. Among these, the positive electrode active material is preferably a lithium-containing transition metal composite oxide or a lithium-containing transition metal phosphate compound, and a lithium-containing transition metal composite oxide that produces a high voltage is particularly preferable.

The transition metal of the lithium-containing transition metal composite oxide is preferably V, Ti, Cr, Mn, Fe, Co, Ni, Cu, or the like. Specific examples of the lithium-transition metal composite oxide include a lithium-cobalt composite oxide such as $LiCoO_2$, a lithium-nickel composite oxide such as $LiNiO_2$, a lithium-manganese composite oxide such as $LiMnO_2$, $LiMn_2O_4$, and $Li_2MnO_3$, and those with some of the transition metal atoms that are main components of these lithium-transition metal composite oxides substituted by other metals such as Al, Ti, V, Cr, Mn, Fe, Co, Li, Ni, Cu, Zn, Mg, Ga, Zr, and Si. Examples of those substituted include a lithium-nickel-manganese composite oxide, a lithium-nickel-cobalt-aluminum composite oxide, a lithium-nickel-cobalt-manganese composite oxide, a lithium-manganese-aluminum composite oxide, and a lithium-titanium composite oxide. More specifically, examples thereof include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, $LiMn_{1.8}Al_{0.2}O_4$, $LiMn_{1.5}Ni_{0.5}O_4$, $Li_4Ti_5O_{12}$, and $LiNi_{0.82}Co_{0.15}Al_{0.03}O_2$.

The transition metal of a lithium-containing transition metal phosphate compound is preferably V, Ti, Cr, Mn, Fe, Co, Ni, Cu, or the like. Specific examples of the lithium-containing transition metal phosphate compound include iron phosphates such as $LiFePO_4$, $Li_3Fe_2(PO_4)_3$, and $LiFeP_2O_7$, cobalt phosphates such as $LiCoPO_4$, and those with some of the transition metal atoms that are main components of these lithium transition metal phosphate compounds substituted by other metals such as Al, Ti, V, Cr, Mn, Fe, Co, Li, Ni, Cu, Zn, Mg, Ga, Zr, Nb, and Si.

In particular, for high voltage, high energy density, or charge/discharge cycle characteristics, $LiCoO_2$, $LiNiO_2$, $LiMn_2O_4$, $LiNi_{0.8}2CO_{0.15}Al_{0.03}O_2$, $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, and $LiFePO_4$ are preferable.

Examples of the sulfur material can include a material containing a sulfur atom. At least one selected from the group consisting of elemental sulfur, a metal sulfide, and an organic sulfur compound is preferable, and elemental sulfur is more preferable. The metal sulfide may be a metal polysulfide. The organic sulfur compound may be an organic polysulfide.

Examples of the metal sulfide include a compound represented by $LiS_x$ ($0<x\leq8$); a compound represented by $Li_2S_x$ ($0<x\leq8$); a compound with a two-dimensional layered structure such as $TiS_2$ and $MoS_2$; and a Chevrel compound with a strong three-dimensional skeletal structure represented by $Me_xMo_6S_8$, wherein Me is one of various transition metals typified by Pb, Ag, and Cu.

Examples of the organic sulfur compound include a carbon sulfide compound.

The organic sulfur compound may be used as a carbon composite material while being carried by a material having pores such as carbon. The content of sulfur in the carbon composite material is preferably 10 to 99 mass %, more preferably 20 mass % or more, further preferably 30 mass % or more, particularly preferably 40 mass % or more, and preferably 85 mass % or less, with respect to the carbon composite material, for further excellent cycle performance and further reduced overvoltage.

In the case where the positive electrode active material is the elemental sulfur, the content of sulfur in the positive electrode active material is equal to the content of the elemental sulfur.

Examples of the electrically conductive polymer include a p-doped electrically conductive polymer and an n-doped electrically conductive polymer. Examples of the electrically conductive polymer include a polyacetylene polymer, a polyphenylene polymer, a heterocyclic polymer, an ionic polymer, and a ladder or network polymer.

In the present disclosure, these positive electrode active materials may be used alone, or two or more of them having different compositional features or different powder physical properties may be used in any combination at any ratio.

The positive electrode preferably further contains a binder, a thickener, a conductive additive, and the like. Any material can be used as the binder, as long as it is a safe material for the solvent and the electrolytic solution used in production of the electrode. Examples thereof include polyvinylidene fluoride, polytetrafluoroethylene, polyethylene, polypropylene, SBR (styrene-butadiene rubber), isoprene elastomer, butadiene elastomer, ethylene-acrylic acid copolymer, ethylene-methacrylic acid copolymer, polyethylene terephthalate, polymethyl methacrylate, polyimide, aromatic polyamide, cellulose, nitro cellulose, NBR (acrylonitrile-butadiene rubber), fluoroelastomer, ethylene-propylene elastomer, styrene-butadiene-styrene block copolymer or a hydrogenated product thereof, EPDM (ethylene-propylene-diene ternary copolymer), styrene-ethylene-butadiene-ethylene copolymer, styrene-isoprene-styrene block copolymer or a hydrogenated product thereof, syndiotactic-1,2-polybutadiene, polyvinyl acetate, ethylene-vinyl acetate copolymer, propylene-α-olefin copolymer, polyvinylidene fluoride, vinylidene fluoride-tetrafluoroethylene copolymer, tetrafluoroethylene-ethylene copolymer, and a polymer composition having an ion-conducting property of alkali metal ions (especially lithium ions). These substances may be used alone, or in any combination of two or more at any ratio.

The content of the binder is generally 0.1 mass % or more, preferably 1 mass % or more, further preferably 1.5 mass % or more, and generally 80 mass % or less, preferably 60 mass % or less, further preferably 40 mass % or less, most preferably 10 mass % or less, as a proportion of the binder in the positive electrode active material layer. When the proportion of the binder is excessively low, the positive electrode active material cannot be sufficiently held, and the mechanical strength of the positive electrode becomes insufficient, which may result in deterioration of battery performance such as cycle characteristics. Meanwhile, an excessively high proportion may lead to a decrease in battery capacity and electric conductivity.

Examples of the thickener include carboxymethylcellulose, methylcellulose, hydroxymethylcellulose, ethylcellulose, polyvinyl alcohol, oxidized starch, phosphorylated starch, casein, and the salts of these. They may be used alone, or in any combination of two or more at any ratio.

The proportion of the thickener with respect to the positive electrode active material is generally 0.1 mass % or more, preferably 0.2 mass % or more, more preferably 0.3 mass % or more, and generally 5 mass % or less, preferably 3 mass % or less, more preferably 2 mass % or less. When it falls below such a range, the coating properties may considerably decrease. When it exceeds such a range, the proportion of the active material in the positive electrode active material layer decreases, which may result in a problem of the decrease in battery capacity or a problem of an increase in the resistance between positive electrode active materials.

The conductive additive is not limited, as long as it can improve the electric conductivity of the electrolyte, but examples thereof can include carbon blacks such as acetylene black and Ketjenblack; carbon fibers such as a multi-walled carbon nanotube, a single-walled carbon nanotube, carbon nanofibers, graphene, and vapor grown carbon fibers (VGCF); and metal powders such as SUS powder and aluminum powder.

(Negative Electrode)

The negative electrode is constituted by a negative electrode active material layer containing a negative electrode active material and a current collector. The negative electrode active material is not limited, and those used in known electrochemical devices can be mentioned. Specifically, the negative electrode active material of a lithium ion secondary battery is not limited, as long as it is capable of electrochemically absorbing/desorbing lithium ions. Specific examples include a carbonaceous material, an alloy material, a lithium-containing metal composite oxide material, and an electrically conductive polymer. These may be used alone, or in any combination of two or more.

The carbonaceous material capable of absorbing/desorbing lithium is preferably artificial graphite, which is produced by high-temperature treatment of graphitizable pitches obtained from various raw materials, or purified natural graphite, or those obtained by surface treatment of such graphite with pitches or other organic substances followed by carbonization. One selected from natural graphite, artificial graphite, an artificial carbonaceous substance, and a carbonaceous material obtained by heat-treating an artificial graphite substance in the range of 400 to 3,200° C. once or more, a carbonaceous material in which the negative electrode active material layer consists of at least two or more carbonaceous matters having different crystallinities and/or has an interface where the carbonaceous matters having different crystallinities are in contact, and a carbonaceous material in which the negative electrode active material layer has an interface where at least two or more carbonaceous matters having different orientation properties are in contact is more preferable, for good balance between the initial irreversible capacity and the charge/discharge characteristics at high-current density. These carbon materials may be used alone, or in any combination of two or more at any ratio.

Examples of the carbonaceous material obtained by heat-treating the artificial carbonaceous substance and the artificial graphite substance in the range of 400 to 3,200° C. once or more include pyrolysis products of organic substances such as a carbon nanotube, graphene, coal coke, petroleum coke, coal pitch, petroleum pitch and those obtained by oxidizing these pitches, needle coke, pitch coke and a carbon agent obtained by partially graphitizing these, furnace black, acetylene black, and pitch carbon fibers, carbonizable organic substances and carbides thereof, or solutions of carbonizable organic substances dissolved in low-molecular weight organic solvents such as benzene, toluene, xylene, quinoline, and n-hexane and carbides thereof.

The metal material (however, excluding lithium titanium composite oxides) used as the negative electrode active material is not limited, as long as it is capable of absorbing/desorbing lithium, and may be any of single lithium, a single metal and alloy forming a lithium alloy, or a compound such as oxide, carbide, nitride, silicide, sulfide, or phosphide thereof. The single metal and alloy forming a lithium alloy is preferably a material containing group 13 and group 14 metal/metalloid elements, more preferably a single metal such as aluminum, silicon, and tin (hereinafter abbreviated to as "specific metal elements") and alloy or a compound containing these atoms. These may be used alone, or in any combination of two or more at any ratio.

Examples of the negative electrode active material having at least one atom selected from the specific metal elements include any one metal alone of the specific metal elements, an alloy consisting of two or more specific metal elements, an alloy consisting of one or more specific metal elements and another or more metal elements, and a compound containing one or more specific metal elements, and a composite compound such as oxide, carbide, nitride, silicide, sulfide, or phosphide of the compound. Use of such a metal alone, alloy, or metal compound as the negative electrode active material can increase the capacity of the battery.

Any one of conventionally known metal particles that can be alloyed with Li can be used, but the metal particles are preferably composed of a metal selected from the group consisting of Fe, Co, Sb, Bi, Pb, Ni, Ag, Si, Sn, Al, Zr, Cr, P, S, V, Mn, Nb, Mo, Cu, Zn, Ge, In, and Ti or a compound thereof, in view of the capacity and the cycle lifetime. Further, an alloy consisting of two or more metals may be used, or the metal particles may be alloy particles formed from two or more metal elements. Among these, a metal or a metal compound thereof selected from the group consisting of Si, Sn, As, Sb, Al, Zn, and W is preferable.

Examples of the metal compound include a metal oxide, a metal nitride, and a metal carbide. Also, an alloy consisting of two or more metals may be used.

Compounds in which these composite compounds are intricately bound to several types of elements of elemental metals, alloys, or non-metal elements are also included. Specifically, an alloy of an element such as silicon and tin and a metal that does not act as the negative electrode can be used. For example, in the case of tin, a complex compound containing 5 to 6 types of elements in combination of a metal other than tin and silicon that acts as the negative electrode, a metal that does not act as the negative electrode, and a non-metal element also can be used.

Among the metal particles that can be alloyed with Li, Si or a Si metal compound is preferable. The Si metal compound is preferably a Si metal oxide. Si or a Si metal compound is preferable for increasing the capacity. In this description, Si or a Si metal compound is generally refer to as a Si compound. Specific examples of the Si compound include $SiO_x$, $SiN_x$, $SiC_x$, and $SiZ_xO_y$ (Z=C,N). The Si compound is preferably a Si metal oxide, and the Si metal oxide is represented by a formula $SiO_x$. The formula $SiO_x$ is obtained by using silicon dioxide ($SiO_2$) and metal Si(Si) as raw materials, and the value of x is generally $0 \le x < 2$. $SiO_x$ has a larger theoretical capacity than graphite, and amorphous Si or nano-sized Si crystals facilitates the entry and exit of alkali ions such as lithium ions, thereby enabling a high capacity to be obtained.

The Si metal oxide is specifically represented as $SiO_x$, where x is $0 \le x < 2$, more preferably 0.2 or more, and 1.8 or less, further preferably 0.4 or more and 1.6 or less, particularly preferably 0.6 or more and 1.4 or less, particular preferably X=0. Within such a range, the irreversible capacity due to the binding of Li and oxygen can be reduced while achieving a high capacity.

Further, a composite material containing the second and third constituent elements in addition to Si or Sn as a first constituent element can be mentioned. The second constituent element is, for example, at least one selected from cobalt, iron, magnesium, titanium, vanadium, chromium, manganese, nickel, copper, zinc, gallium, and zirconium. The third constituent element is, for example, at least one selected from boron, carbon, aluminum, and phosphorus.

The lithium-containing metal composite oxide material used as the negative electrode active material is not limited, as long as it is capable of absorbing/desorbing lithium, but a material containing titanium and lithium is preferable, a lithium-containing composite metal oxide material containing titanium is more preferable, and a composite oxide of lithium and titanium (hereinafter abbreviated as "lithium titanium composite oxide") is further preferable, in view of the charge/discharge characteristics at high-current density. That is, use of a lithium titanium composite oxide having a spinel structure contained in a negative electrode active material for batteries is particularly preferable since the output resistance is significantly reduced.

The lithium titanium composite oxide is preferably a compound represented by formula:

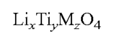

$$Li_xTi_yM_zO_4$$

wherein M represents at least one element selected from the group consisting of Na, K, Co, Al, Fe, Ti, Mg, Cr, Ga, Cu, Zn and Nb. Among the aforementioned compositional features, the structures of:

(i) $1.2 \le x \le 1.4$, $1.5 \le y \le 1.7$, $z=0$;
(ii) $0.9 \le x \le 1.1$, $1.9 \le y \le 2.1$, $z=0$; and
(iii) $0.7 \le x \le 0.9$, $2.1 \le y \le 2.3$, $z=0$ are particularly preferable, for balanced battery performance.

Particularly preferable representative compositional features of the aforementioned compounds are $Li_{4/3}Ti_{5/3}O_4$ in (i), $Li_1Ti_2O_4$ in (ii), and $Li_{4/5}Ti_{11/5}O_4$ in (iii). For the structure of $Z \neq 0$, preferable examples include $Li_{4/4}Ti_{4/3}Al_{1/3}O_4$.

The negative electrode preferably further comprises a binder, a thickener, and a conductive additive.

Examples of the binder include those similar to the binder that can be used for the positive electrode. The proportion of the binder with respect to the negative electrode active material is preferably 0.1 mass % or more, further preferably 0.5 mass % or more, particularly preferably 0.6 mass % or more, and preferably 20 mass % or less, more preferably 15 mass % or less, further preferably 10 mass % or less, particularly preferably 8 mass % or less. When the proportion of the binder with respect to the negative electrode active material exceeds such a range, the proportion of the binder that does not contribute to the battery capacity increases, which may lead to a decrease in the battery capacity. When the proportion falls below such a range, the strength of the negative electrode may decrease.

In particular, in the case of containing a rubbery polymer typified by SBR as a main component, the proportion of the binder with respect to the negative electrode active material is generally 0.1 mass % or more, preferably 0.5 mass % or more, further preferably 0.6 mass % or more, and generally 5 mass % or less, preferably 3 mass % or less, further preferably 2 mass % or less. Further, in the case of containing a fluorine-containing polymer typified by polyvinylidene fluoride as a main component, the proportion with respect to the negative electrode active material is generally 1 mass % or more, preferably 2 mass % or more, further preferably 3 mass % or more, and generally 15 mass % or less, preferably 10 mass % or less, further preferably 8 mass % or less. Further, in the case of containing a fluorine-free polymer typified by polyacrylic acid as a main component, the proportion with respect to the negative electrode active material is generally 0.1 mass % or more, preferably 0.5 mass % or more, further preferably 0.6 mass % or more, and generally 5 mass % or less, preferably 3 mass % or less, further preferably 2 mass % or less.

Examples of the thickener include those similar to the thickener that can be used for the positive electrode. The proportion of the thickener with respect to the negative electrode active material is generally 0.1 mass % or more, preferably 0.5 mass % or more, further preferably 0.6 mass % or more, and generally 5 mass % or less, preferably 3 mass % or less, further preferably 2 mass % or less. When the proportion of the thickener with respect to the negative electrode active material falls below such a range, the coating properties may significantly decrease. Meanwhile, when the proportion exceeds such a range, the proportion of the negative electrode active material in the negative electrode active material layer decreases, which may result in a decrease in battery capacity and an increase in the resistance between negative electrode active materials.

The conductive additive is not limited, as long as it can improve the electric conductivity of the electrolyte, but examples thereof include those similar to the thickener that can be used for the positive electrode.

Examples of the current collectors (the positive electrode current collector and the negative electrode current collector) include a metal foil or a metal mesh of iron, stainless steel, copper, aluminum, nickel, titanium, and the like. Among them, the positive electrode current collector is preferably an aluminum foil or the like, and the negative electrode current collector is preferably a copper foil or the like.

(Method for Producing Secondary Solid-State Battery)

The method for producing the secondary solid-state battery of the present disclosure is not limited, and it can be produced by a conventionally known method. Examples of the method for producing each electrode include dispersing and mixing each electrode active material in a solution or a dispersion of a binder dissolved or dispersed in a dispersion medium, to prepare an electrode mixture. The electrode mixture obtained is uniformly applied to a current collector such as a metal foil or a metal mesh, followed by drying and pressing, as required, to form a thin electrode mixture layer on the current collector as a thin film electrode.

Other than the above, the mixture may be produced, for example, by mixing the binder and the electrode active material first and then adding the dispersion medium. Further, it is also possible to produce an electrode sheet by heat-melting the binder and the electrode active material, extruding it with an extruder to produce a thin film mixture, and laminating it onto the current collector coated with an electrically conductive adhesive or a general-purpose organic solvent. Further, a solution or a dispersion of the binder may be applied to the electrode active material preformed in advance.

EXAMPLES

Hereinafter, the present disclosure will be specifically described based on the examples. In the following examples, "parts" and "%" respectively refer to "parts by mass" and "mass %", unless otherwise specified.

Example 1

As a polymer 1, a copolymer of tetrafluoroethylene and N-vinyl-2-pyrrolidone (with a composition ratio of 48:52 (molar ratio)) was used. The polymer 1, and 20 mass % of LiTFSI as an alkali metal salt and 60 mass % of BMI-TFSI as an ionic liquid with respect to the polymer 1 were dissolved in dimethylformamide (DMF) to prepare a polymer electrolyte solution. The polymer electrolyte solutions were cast on a copper foil using an applicator and adjusted to a thickness of about 60 μm after drying. The cast polymer electrolyte solutions were dried at 100° C. under reduced pressure for 24 hours, to produce composite film 1.

Example 2

As a polymer 2, a copolymer of tetrafluoroethylene and N-vinyl-2-pyrrolidone (with a composition ratio of 36:64 (molar ratio)) was used. The polymer 2, and 20 mass % of LiTFSI as an alkali metal salt and 60 mass % of BMI-TFSI as an ionic liquid with respect to the polymer 2 were dissolved in dimethylformamide (DMF) to prepare a polymer electrolyte solution, to produce a composite film 2 in the same manner as in Example 1.

Example 3

As a polymer 3, a copolymer of tetrafluoroethylene and triethylene glycol monovinyl ether (with a composition ratio of 51:49 (molar ratio)) was used. The polymer 3, and 20 mass % of LiTFSI as an alkali metal salt, 60 mass % of BMI-TFSI as an ionic liquid, and 1 mass % of benzophenone with respect to the polymer 3 were dissolved in dimethylformamide (DMF) to prepare a polymer electrolyte solution. The polymer electrolyte solution was cast on a copper foil using an applicator and adjusted to a thickness after drying of about 60 μm. The polymer electrolyte solution cast was dried at 100° C. for 24 hours under reduced pressure, followed by UV irradiation for 7 minutes and 30 seconds, to produce a composite film 3.

Example 4

As a polymer 4, a copolymer of tetrafluoroethylene and lithium trifluorovinyloxytetrafluoroethane sulfonate (with a composition ratio of 50:50 (molar ratio)) was used. The polymer 4, and 20 mass % of LiTFSI as an alkali metal salt and 60 mass % of BMI-TFSI as an ionic liquid with respect to the polymer 4 were dissolved in dimethylformamide (DMF), to produce a composite film 4 in the same manner as in Example 1.

Example 5

As a polymer 5, a copolymer of tetrafluoroethylene and lithium trifluorovinyloxytetrafluoropropanoate (with a composition ratio of 30:70 (molar ratio)) was used. The polymer 5, and 20 mass % of LiTFSI as an alkali metal salt and 60 mass % of BMI-TFSI as an ionic liquid with respect to the polymer 5 were dissolved in dimethylformamide (DMF), to produce a composite film 5 in the same manner as in Example 1.

Comparative Example 1

As a polymer 6, a polyethylene oxide was used. 20 mass % of LiTFSI as an alkali metal salt and 60 mass % of BMI-TFSI as an ionic liquid were dissolved in dimethylformamide (DMF), to produce a composite film 6 in the same manner as in Example 1.

(Measurement of Volatile Content)

The composite films produced as described above were further heated at 100° C. under reduced pressure for 48 hours, to calculate the volatile content from the change in mass before and after drying.

(Flammability Test)

The composite films produced were exposed to a naked flame of a lighter for 3 seconds, and the ease of flame transfer and flammability were visually observed.

If there was no flame transfer, it was determined to be flame retardant.

(Measurement of Ion Conductivity)

As samples for this measurement, composites similar to those in Examples 1 to 5 and Comparative Example 1 were used. Each composite film was punched into a diameter of 13 mm, and stainless steel was used as the working and counter electrodes, to create a bipolar cell. The battery created was connected to a complex AC impedance measuring device using a flow line in a constant-temperature oven set at 60° C., followed by standing for 3 hours in order to allow the electrolyte and the electrodes to be sufficiently blended. Then, measurement was performed, to calculate the ion conductivity from the following formula.

$$\sigma = C/R (C = l/S)$$

Here, 1 represents the thickness of a sample, S represents its area, and R represents its resistance.

From the results of Table 2, it turned out that the composite films of Examples 1 to 5 exhibited sufficient ion conductivity as electrolytes for polymer-based solid-state batteries.

(Evaluation of Oxidation Resistance)

The oxidation resistance of the composite films was evaluated by the LSV (Linear Sweep Voltammetry) method. For the LSV measurement, propylene carbonate was used as a solvent, and the solvent containing 3 mass % of LiTFSI was used. One mass % of each of the aforementioned polymers (Examples 1 and 4, and Comparative Example 1) was added to the solution to prepare two solutions. Each measurement solution prepared in advance was put into a measurement container, and a platinum electrode as a working electrode and those immersed with a lithium metal as a counter electrode and a reference electrode were used to form a LSV measurement cell. Then, measurement was performed by sweeping the potential from OCV (open circuit voltage) to 8 V (vs. $Li^+/Li$) on the oxidation side at a sweep rate of 5 mV/s. The FIGURE shows the results. Examples 1, 3 and 5 were shown to have high oxidation resistance.

TABLE 1

| | Electrolyte | Volatile content (mass %) | Flame retardancy |
|---|---|---|---|
| Example 1 | Composite film 1 | <0.01 | ○ |
| Example 2 | Composite film 2 | <0.01 | ○ |
| Example 3 | Composite film 3 | <0.01 | ○ |
| Example 4 | Composite film 4 | <0.01 | ○ |
| Example 5 | Composite film 5 | <0.01 | ○ |
| Comparative Example 1 | Composite film 6 | <0.01 | x |

TABLE 2

| | Electrolyte | Ion conductivity (S/cm) |
|---|---|---|
| Example 1 | Composite film 1 | $1.3 \times 10^{-8}$ |
| Example 2 | Composite film 2 | $1.4 \times 10^{-8}$ |
| Example 3 | Composite film 3 | $2.3 \times 10^{-7}$ |
| Example 4 | Composite film 4 | $1.7 \times 10^{-9}$ |
| Example 5 | Composite film 5 | $1.5 \times 10^{-7}$ |

(Production of Lithium Ion Secondary Battery)

[Production of Positive Electrode]

95 mass % of $LiNi_{0.5}Co_{0.2}Mn_{0.3}O_2$ (NMC) as a positive electrode active material, 3 mass % of acetylene black as a conductive material, and 2 mass % of polyvinylidene fluoride (PVdF) as a binder were mixed in an N-methylpyrrolidone solvent to form a slurry. The slurry obtained was applied onto one side of an aluminum foil having a thickness of 15 μm to which a conductive additive was applied in advance, dried, and roll-pressed with a press machine. The resultant was cut out to form a positive electrode 1. A positive electrode 2 was produced in the same manner as above except that $LiMn_{1.5}Ni_{0.5}O_4$ (LNMO) as a positive electrode active material was used.

[Production of Negative Electrode]

To 98 parts by mass of a carbonaceous material (graphite), there were added 1 part by mass of an aqueous dispersion of sodium carboxymethylcellulose (concentration of sodium carboxymethylcellulose: 1 mass %) and 1 part by mass of an aqueous dispersion of styrene-butadiene elastomer (concentration of styrene-butadiene elastomer: 50 mass %) as a thickener and a binder, followed by mixing with a disperser, to form a slurry. The slurry obtained was applied onto a copper foil having a thickness of 10 μm, dried, and rolled with a press machine. The resultant was cut out to form a negative electrode.

[Production of Aluminum Laminate Cell]

The positive electrode, the composite film 1, 3 or 5, and the negative electrode were opposed and rolled with a roll press machine, to enhance the adhesion.

Thereafter, it was punched, attached with an electrode tab, sealed, precharged, and then aged, to produce a lithium ion secondary battery 1 having a design capacity of 1 Ah. A lithium ion secondary battery 2 was produced in the same manner as above except that a positive electrode 2 was used.

[Evaluation of Initial Discharge Capacity]

While the secondary battery 1 produced above was interposed between plates to be pressurized, the battery was charged at a constant current and a constant voltage to 4.2 V at 25° C. with a current corresponding to 0.1 C. While the secondary battery 2 produced above was interposed between plates to be pressurized, the battery was charged at a constant current and a constant voltage to 4.8 V at 25° C. with a current corresponding to 0.1 C.

(Nail Penetration Test)

The lithium ion secondary batteries 1 and 2 produced were fixed to a horizontal table in an atmosphere of 25° C., and a ceramic nail having a diameter of 3 mm was inserted from above the battery toward the center of the battery at a nail penetration speed of 80 mm/s for the nail penetration test. Then, the state was observed, and the temperature was measured.

In the batteries produced using the composite films 1, 3, and 5, no fuming, explosion, or ignition was observed, and the temperature change on the surface of the battery was within 5° C.

From the above, it was confirmed to be a battery with high safety.

INDUSTRIAL APPLICABILITY

The composite of the present disclosure can be suitably used as an electrolyte for polymer-based solid-state batteries. The polymer-based solid-state battery obtained is excellent in flame retardancy, oxidation resistance, and the like.

The invention claimed is:

1. A composite, comprising:
a fluorine-containing copolymer,
an alkali metal salt, and
an ionic liquid,
wherein the fluorine-containing copolymer essentially comprises:
a structural unit represented by formula (1):

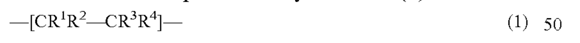

$-[CR^1R^2-CR^3R^4]-$ (1)

wherein $R^1$ to $R^4$ are each independently H, F, CI, $CF_3$, or $OR^{10}$, where $R^{10}$ is an organic group having 1 to 8 carbon atoms, provided that at least one of $R^1$ to $R^4$ is F; and
a structural unit represented by formula (2), which is at least one selected from the group consisting of vinylpyrrolidone, a monomer represented by formula (3), a monomer represented by formula (4), and a monomer represented by formula (5):

(3)

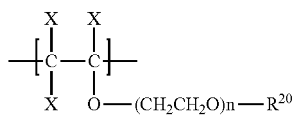

wherein in formula (3), X represents H or F, n represents an integer of 1 to 8, and $R^{20}$ represents H or an alkyl group having 1 to 10 carbon atoms;

(4)

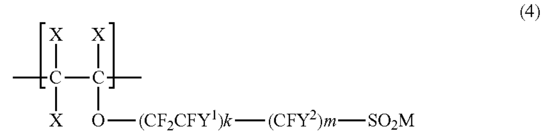

wherein in formula (4), X represents H or F, $Y^1$ represents F, Cl, or $CF_3$, $Y^2$ represents F or Cl, k and m each represent an integer of 0 to 2, and M represents an alkali metal; and (5)

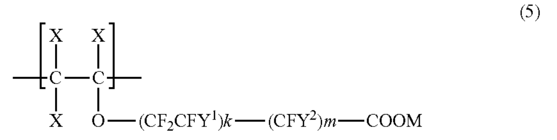

wherein in formula (5), X represents H or F, $Y^1$ represents F, Cl, or $CF_3$, $Y^2$ represents F or Cl, k and m each represent an integer of 0 to 2, and M represents an alkali metal,
wherein the composite has a volatile content of 0.1 mass % or less with respect to the entire composite, and
wherein a molar ratio of the structural unit represented by formula (1) to the structural unit represented by formula (2) ((1)/(2)) is in a range of 0.07 to 1.86.

2. The composite according to claim 1, wherein
the structural unit represented by formula (1) is a tetrafluoroethylene unit.

3. The composite according to claim 1, wherein
the fluorine-containing copolymer has a composition range with a content of the structural unit represented by formula (1) of 1 to 60 mol % and a content of the structural unit represented by formula (2) of 40 to 99 mol %.

4. The composite according to claim 1, wherein
the fluorine-containing copolymer has a crosslinked chain.

5. The composite according to claim 1, wherein
the alkali metal salt is at least one lithium salt selected from the group consisting of $LiPF_6$, $LiBF_4$, LiTFSI, LIFSI, $LiPO_2F_2$, and LiBOB.

6. The composite according to claim 1, wherein
the alkali metal salt is contained in a proportion of 0.1 to 90 mass % with respect to the fluorine-containing copolymer.

7. The composite according to claim 1, wherein
the ionic liquid is at least one selected from combinations of 1-butyl-3-methyl imidazolium (BMI) cation or N-methyl-N-butyl-pyrrolidium (Pyr14) cation as an organic cation and $BF_4$ anion or bis(trifluoromethanesulfonyl) imide (TFSI) anion as an anion.

8. The composite according to claim 1, wherein
the ionic liquid is contained in a proportion of 1.0 to 500 mass % with respect to the fluorine-containing copolymer.

9. The composite according to claim 1, wherein the composite is a flame retardant.

10. A polymer electrolyte consisting of the composite according to claim 1.

11. An electrochemical device comprising the polymer electrolyte according to claim 10.

12. A polymer-based solid-state battery comprising the polymer electrolyte according to claim 10.

13. The polymer-based solid-state battery according to claim 12, wherein the battery is a lithium ion secondary battery.

14. An actuator comprising the polymer electrolyte according to claim 10.

* * * * *